US010960800B2

(12) United States Patent
Kamiya et al.

(10) Patent No.: US 10,960,800 B2
(45) Date of Patent: Mar. 30, 2021

(54) SEAT FRAME

(71) Applicant: TOYOTA BOSHOKU KABUSHIKI KAISHA, Aichi-ken (JP)

(72) Inventors: Shinji Kamiya, Aichi-ken (JP); Kimiyasu Kurokawa, Gifu-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/556,442

(22) Filed: Aug. 30, 2019

(65) Prior Publication Data

US 2020/0070698 A1     Mar. 5, 2020

(30) Foreign Application Priority Data

Aug. 31, 2018   (JP) .............................. JP2018-162885

(51) Int. Cl.
*B60N 2/68*      (2006.01)
*B60N 2/64*      (2006.01)

(52) U.S. Cl.
CPC .............. *B60N 2/682* (2013.01); *B60N 2/64* (2013.01); *B60N 2205/30* (2013.01)

(58) Field of Classification Search
CPC ....... B60N 2/64; B60N 2/682; B60N 2205/30
USPC ........................................ 297/452.18, 452.2
See application file for complete search history.

(56) References Cited

U.S. PATENT DOCUMENTS

| | | | | |
|---|---|---|---|---|
| 4,067,613 A | * | 1/1978 | Pesiri | B60N 2/753 297/411.32 X |
| 4,118,069 A | * | 10/1978 | Hunter | A47C 7/543 297/411.32 X |
| 4,205,879 A | * | 6/1980 | Heling | B60N 2/753 297/411.32 X |
| 4,466,664 A | * | 8/1984 | Kondou | B60N 2/767 297/411.32 X |
| 5,131,721 A | * | 7/1992 | Okamoto | B60N 2/75 297/452.18 |
| 5,318,341 A | * | 6/1994 | Griswold | B60N 2/233 297/452.18 X |
| 5,447,360 A | * | 9/1995 | Hewko | B60N 2/4235 297/452.18 X |
| 5,498,096 A | * | 3/1996 | Johnson | F16L 13/103 297/452.2 X |

(Continued)

FOREIGN PATENT DOCUMENTS

JP      2017-030485      2/2017

*Primary Examiner* — Rodney B White
(74) *Attorney, Agent, or Firm* — Greenblum & Bernstein, P.L.C.

(57) ABSTRACT

A seat frame includes: a first side frame and a second side frame; a structural member connected to at least one of the first side frame and the second side frame; and a coupling member welded to the at least one of the side frames. The coupling member has a cylindrical portion, a closing portion, and a protruding portion having a smaller outer shape than the cylindrical portion, and protruding outward in an axial direction of the cylindrical portion from the closing portion. The at least one of the side frames is provided with a protruding portion insertion hole that allows insertion of the protruding portion and has a shape smaller than the outer shape of the cylindrical portion. The protruding portion is welded to the at least one of the side frames while being positioned in the protruding portion insertion hole.

5 Claims, 4 Drawing Sheets

(56) References Cited

U.S. PATENT DOCUMENTS

| | | | | |
|---|---|---|---|---|
| 5,645,316 | A * | 7/1997 | Aufrere | B60N 2/2222 297/452.2 X |
| 5,988,756 | A * | 11/1999 | Aufrere | B60N 2/68 297/452.18 X |
| 6,082,823 | A * | 7/2000 | Aumont | B60N 2/2222 297/452.18 X |
| 6,817,672 | B2 * | 11/2004 | Matsunuma | B60N 2/682 297/452.18 |
| 7,284,800 | B2 * | 10/2007 | Ishizuka | B60N 2/753 297/452.18 X |
| 7,497,521 | B2 * | 3/2009 | Whalen | B60R 22/34 297/452.18 X |
| 7,992,941 | B2 * | 8/2011 | Hara | B60N 2/682 297/411.32 X |
| 8,668,272 | B2 * | 3/2014 | Sankaran | B60N 2/0881 297/452.18 |
| 8,857,913 | B2 * | 10/2014 | Schuhmacher | B60N 2/2356 297/452.2 |
| 8,926,022 | B2 * | 1/2015 | Watanabe | B60N 2/68 297/452.2 |
| 8,931,850 | B2 * | 1/2015 | Mitsuhashi | B60N 2/22 297/452.2 |
| 2001/0052724 | A1 * | 12/2001 | Kamper | B60N 2/4228 297/452.2 |
| 2006/0145522 | A1 * | 7/2006 | Yamada | B60N 2/236 297/452.2 X |
| 2010/0187886 | A1 * | 7/2010 | Yamada | B60N 2/22 297/452.2 X |
| 2010/0187887 | A1 * | 7/2010 | Yamada | B60N 2/682 297/452.2 X |
| 2011/0006580 | A1 * | 1/2011 | Ishimoto | B60N 2/68 297/452.18 |
| 2011/0163587 | A1 * | 7/2011 | Kmeid | B60N 2/2809 297/452.2 |
| 2012/0256465 | A1 * | 10/2012 | Lilla | B60N 2/161 297/452.2 |
| 2015/0336477 | A1 * | 11/2015 | Matsui | B60N 2/06 297/452.2 X |
| 2017/0028892 | A1 | 2/2017 | Matsui | |
| 2018/0208093 | A1 * | 7/2018 | Fukuda | B60N 2/68 |
| 2018/0236902 | A1 * | 8/2018 | Niwa | B60R 22/26 |

* cited by examiner

SEAT FRAME

This nonprovisional application is based on Japanese Patent Application No. 2018-162885 filed on Aug. 31, 2018 with the Japan Patent Office, the entire contents of which are hereby incorporated by reference.

BACKGROUND

Field

The present disclosure relates to a seat frame.

Description of the Background Art

Japanese Patent Laying-Open No. 2017-30485, for example, discloses a seat frame including paired side frames, a front pipe disposed between the paired side frames, and a collar attached to each end of the front pipe. The collar has a cylindrical portion surrounding the end of the front pipe, and a flange portion shaped to protrude outward in a radial direction of the cylindrical portion from the end of the cylindrical portion. The flange portion is formed in an annular shape. A boundary portion between an outer edge portion of the flange portion and the side frame is welded.

SUMMARY

There is known a seat frame formed by welding a collar (coupling member) for coupling a front pipe to a side frame, as is described in Japanese Patent Laying-Open No. 2017-30485. In this seat frame, the collar has a flange portion protruding outward in a radial direction from a cylindrical portion of the collar, and furthermore, the flange portion has an outer edge portion welded to the side frame. As a result, the space required to attach the collar to the side frame, including a welded portion, is increased.

An object of the present disclosure is to provide a seat frame capable of achieving reduced space required to attach a coupling member to a side frame.

A seat frame according to the present disclosure includes: a first side frame and a second side frame forming a framework of a vehicle seat; a structural member connected to at least one of the first side frame and the second side frame; and a coupling member welded to the at least one of the side frames so as to couple the structural member to the at least one of the side frames. The coupling member has a cylindrical portion connected to an end of the structural member, a closing portion closing one opening in the cylindrical portion, and a protruding portion having a smaller outer shape than the cylindrical portion, and protruding outward in an axial direction of the cylindrical portion from the closing portion. The at least one of the side frames is provided with a protruding portion insertion hole that allows insertion of the protruding portion and has a shape smaller than the outer shape of the cylindrical portion. The protruding portion is welded to the at least one of the side frames while being positioned in the protruding portion insertion hole.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
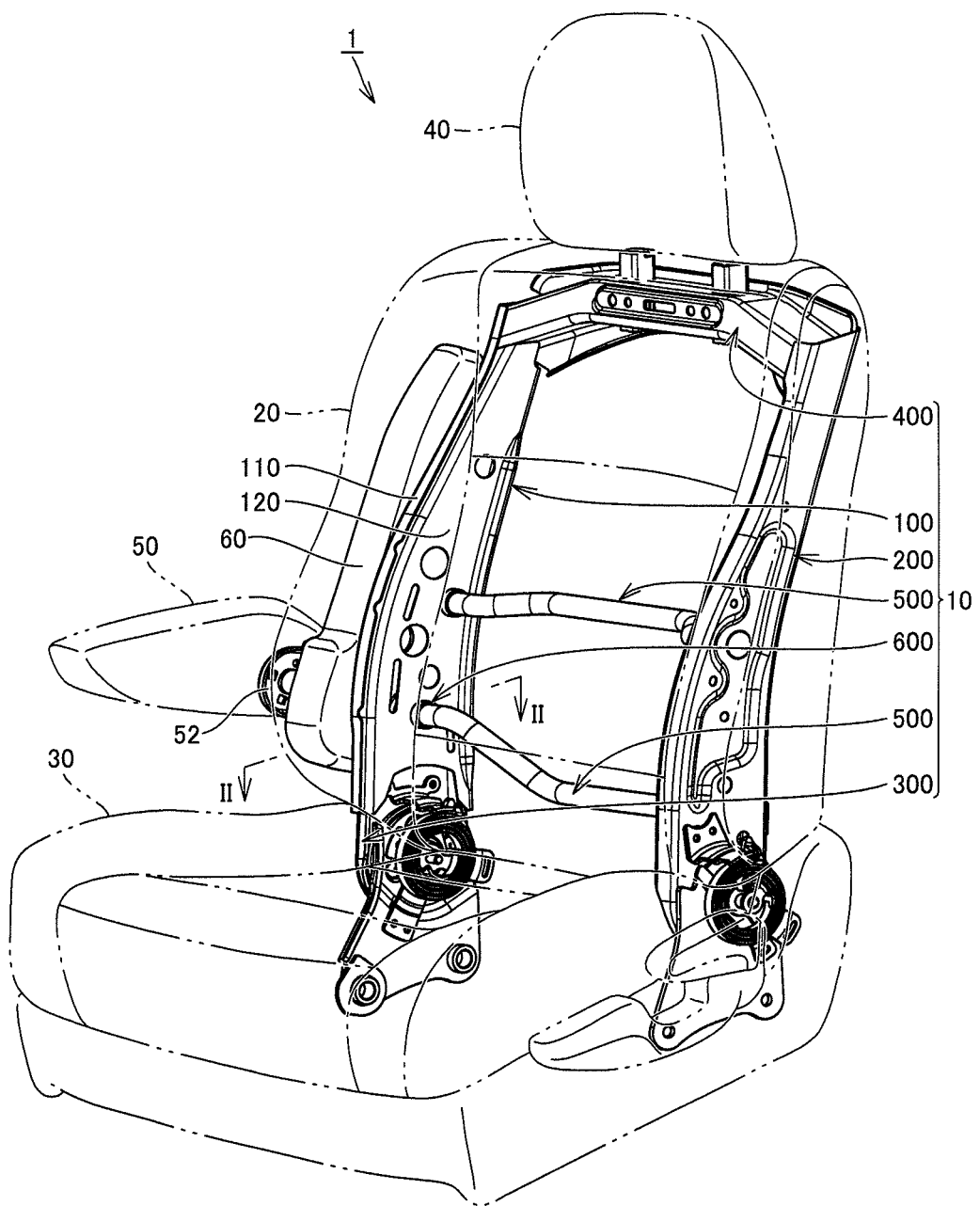
FIG. 1 is a perspective view schematically showing an overall structure of a vehicle seat including a seat frame of one embodiment of the present disclosure.

Embodiments of the present disclosure will be described with reference to the drawings. The same or corresponding components are designated by the same numbers in the drawings referenced below.

FIG. 1 is a perspective view schematically showing an overall structure of a vehicle seat including a seat frame of one embodiment of the present disclosure. A vehicle seat 1 functions as a car seat. As shown in FIG. 1, vehicle seat 1 of the present embodiment has a seat back 20 having a seat frame 10 as its framework, a seat cushion 30, a headrest 40, an armrest 50, an armrest holding bracket 52, and an air bag unit 60.

Seat back 20 forms a backrest surface on its front surface. Seat cushion 30 forms a sitting surface on its upper surface. Headrest 40 is provided on the top of seat back 20. Armrest 50 is disposed on one side of seat back 20 in a seat width direction. Air bag unit 60 is disposed within seat back 20 on the outer side in the seat width direction.

Seat frame 10 forms a framework of vehicle seat 1. In the present embodiment, seat frame 10 forms a framework of seat back 20. Seat frame 10 may form a framework of seat cushion 30, however. Seat frame 10 has a first side frame 100, a second side frame 200, a reinforcing member 300, an upper frame 400, a structural member 500, and a coupling member 600.

First side frame 100 has a shape extending in upward-downward directions. Armrest 50 and air bag unit 60 are connected to this first side frame 100. Second side frame 200 has a shape extending in the upward-downward directions. Second side frame 200 is spaced from first side frame 100 in the seat width direction. The structure of first side frame 100 and second side frame 200 will be described later.

Upper frame 400 connects the upper end of first side frame 100 and the upper end of second side frame 200.

Structural member 500 is a member that is connected to at least one of first side frame 100 and second side frame 200. In the present embodiment, structural member 500 has a shape extending in the seat width direction between first side frame 100 and second side frame 200. Structural member 500 is connected to both first side frame 100 and second side frame 200. Specifically, a reinforcing pipe for reinforcing first side frame 100 and second side frame 200 is used as structural member 500. Structural member 500 is formed in a cylindrical shape. Structural member 500 is curved or bent at appropriate positions as needed. While two structural members 500 are shown in FIG. 1, the number of structural members 500 is not limited thereto.

Coupling member 600 is a member for coupling structural member 500 to at least one of first side frame 100 and second side frame 200. Coupling member 600 is welded to the at least one of the side frames. In the present embodiment, coupling member 600 couples structural member 500 to both first side frame 100 and second side frame 200. Specifically, coupling member 600 has a first collar 610 and a second collar (not shown).

Figure 2:
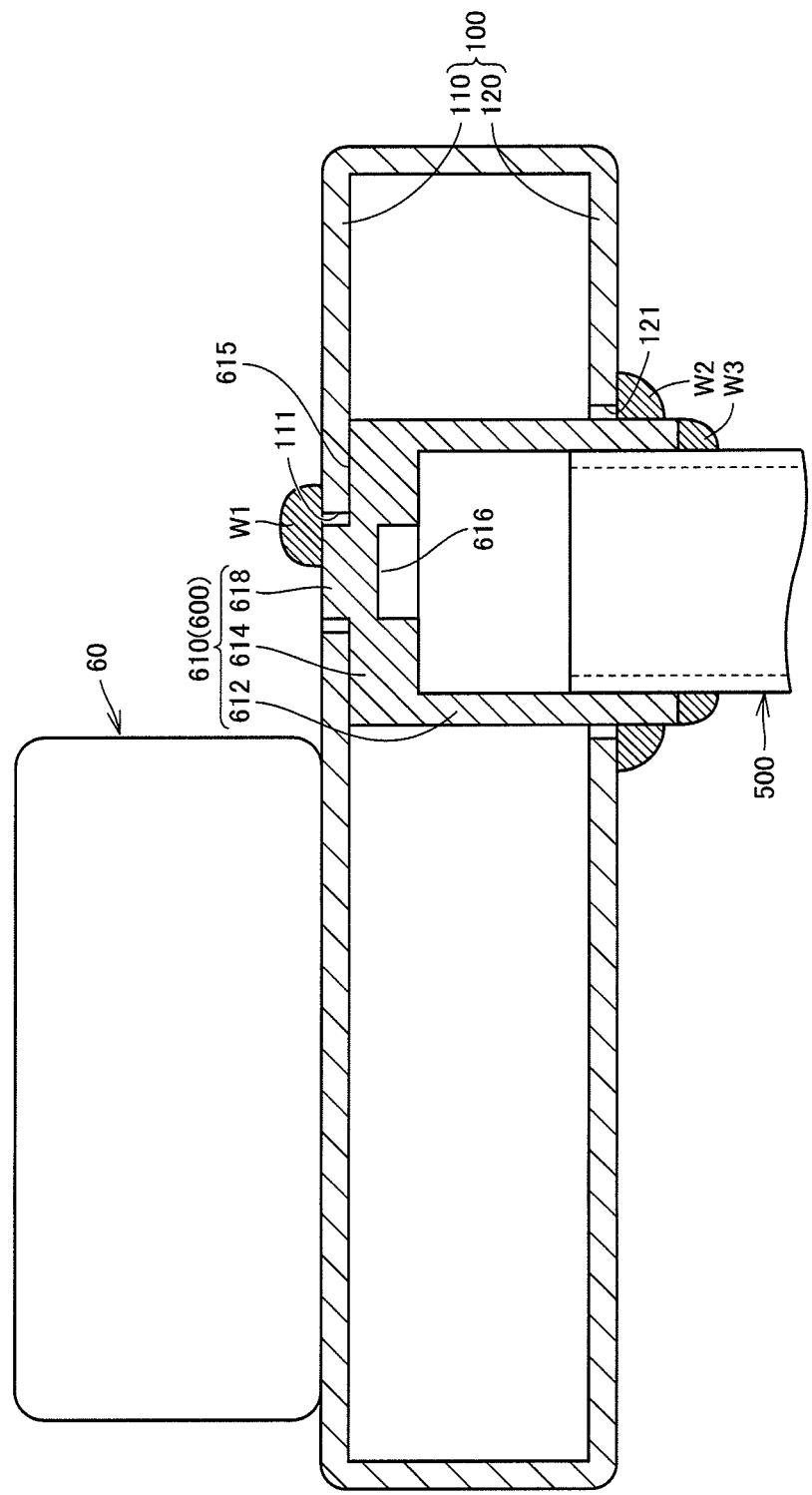
FIG. 2 is a cross-sectional view taken along the line II-II in FIG. 1.
Figure 3:
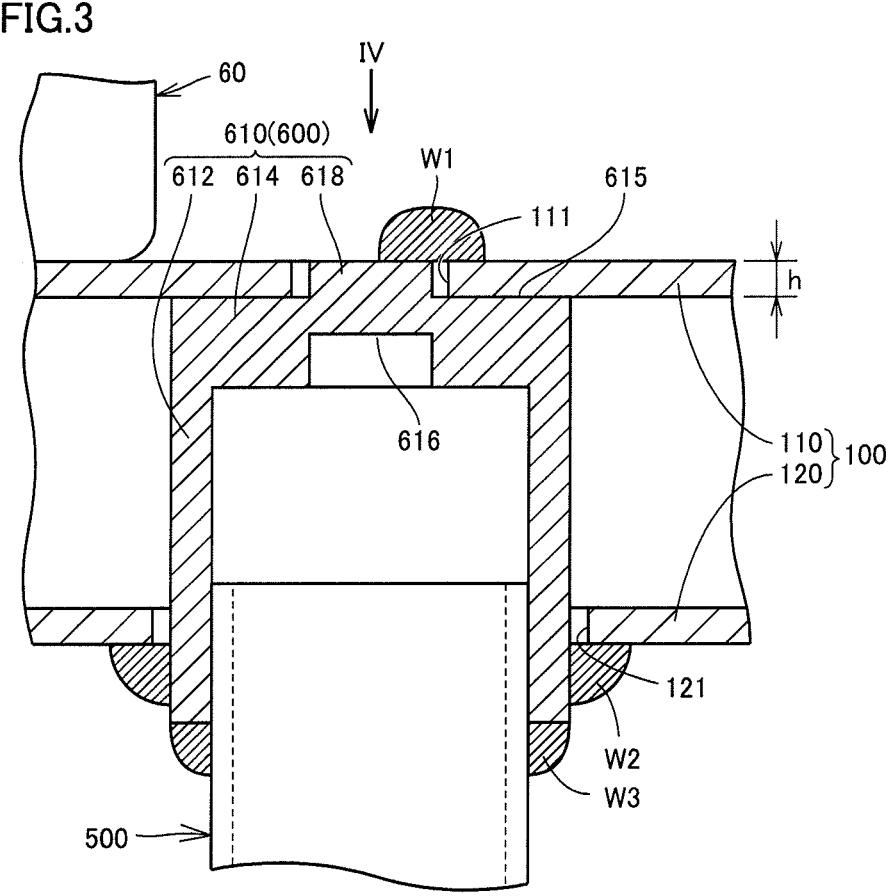
FIG. 3 is an enlarged view of a cross section of a coupling member.

First collar 610 is a member for coupling one end of structural member 500 to first side frame 100, and is welded to first side frame 100. FIG. 2 is a cross-sectional view taken along the line II-II in FIG. 1. FIG. 3 is an enlarged view of a cross section of the coupling member. As shown in FIGS. 2 and 3, first collar 610 has a cylindrical portion 612, a closing portion 614, and a protruding portion 618.

Cylindrical portion 612 is connected to one end of structural member 500. For example, a boundary portion between the end of cylindrical portion 612 and an outer circumferential surface of structural member 500 is welded. A welded portion W3 is thereby formed. Cylindrical portion 612 has a shape surrounding the one end of structural member 500. Cylindrical portion 612 is formed in a cylindrical shape in the present embodiment.

Closing portion 614 has a shape closing one opening in cylindrical portion 612. Closing portion 614 has an outer surface 615 having a shape making surface contact with first side frame 100. This outer surface 615 is flatly formed. Closing portion 614 has a recess 616 depressed outward in an axial direction of cylindrical portion 612. Closing portion 614 has a greater thickness than cylindrical portion 612.

Protruding portion 618 has a smaller outer shape than cylindrical portion 612, and has a shape protruding outward in the axial direction of cylindrical portion 612 from outer surface 615 of closing portion 614. Protruding portion 618 has a cylindrical outer circumferential surface. As shown in FIG. 3, a protruding dimension h of protruding portion 618 from outer surface 615 of closing portion 614 is set to be equal to the thickness of (to match the thickness of) first side frame 100.

The second collar is a member for coupling structural member 500 to second side frame 200, and is welded to second side frame 200. The second collar is connected (welded) to the other end of structural member 500. Since the second collar is identical in structure to first collar 610, the description of the second collar will not be provided.

First side frame 100 is now described. As shown in FIG. 2, first side frame 100 forms a closed cross section. Specifically, first side frame 100 has an outer frame 110 and an inner frame 120.

Outer frame 110 is disposed on the outer side in the seat width direction (upward and downward directions in FIG. 3). Outer frame 110 is formed as a plate. For example, both ends of outer frame 110 in seat forward and backward directions are bent inward in the seat width direction.

As shown in FIG. 3, outer frame 110 is provided with a protruding portion insertion hole 111 that allows the insertion of protruding portion 618 and has a shape smaller than the outer shape of cylindrical portion 612. Protruding portion insertion hole 111 preferably has a larger outer shape than protruding portion 618. In the present embodiment, protruding portion insertion hole 111 is formed in a circular shape. Protruding portion 618 is welded to outer frame 110 while being inserted (positioned) in this protruding portion insertion hole 111.

As shown in FIG. 3, protruding dimension h of protruding portion 618 is set to match the thickness of outer frame 110. Thus, when protruding portion 618 is inserted in protruding portion insertion hole 111, and outer surface 615 of closing portion 614 makes surface contact with an inner surface of outer frame 110, an outer surface (upper surface in FIG. 3) of protruding portion 618 is flush with an outer surface of outer frame 110. In this state, a boundary portion between protruding portion 618 and outer frame 110 is welded by arc welding or the like from the outer side of outer frame 110 in the seat width direction. A welded portion W1 is formed by this welding. Air bag unit 60 is connected to a portion in the vicinity of welded portion W1 of the outer surface of outer frame 110 in the seat width direction.

Figure 4:
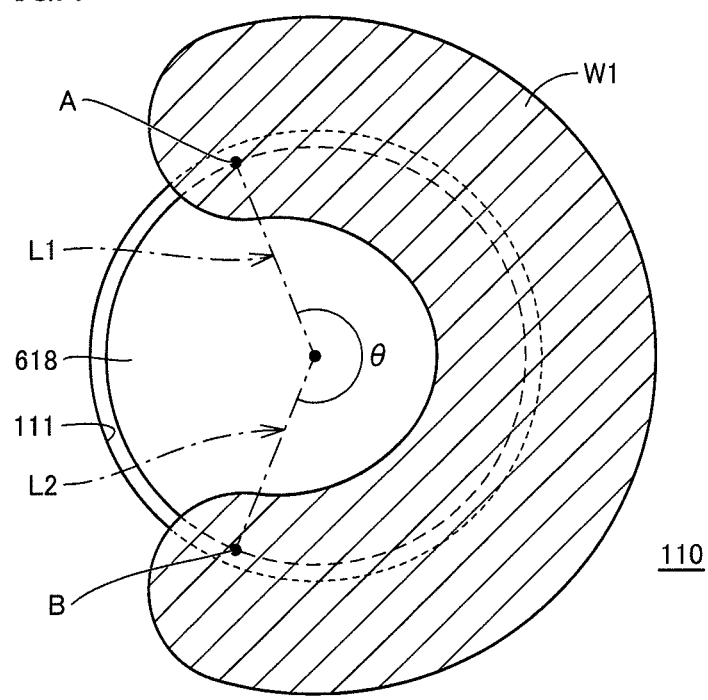
FIG. 4 shows a protruding portion and a side frame as seen in a direction indicated by an arrow IV in FIG. 3.

FIG. 4 shows the protruding portion and the side frame as seen in a direction indicated by an arrow IV in FIG. 3. As shown in FIG. 4, welded portion W1 has a shape extending continuously along a circumferential direction of protruding portion 618 over a region having a length equal to or greater than half the circumference of protruding portion 618 of the outer circumferential surface of protruding portion 618. One end and the other end of welded portion W1 in the circumferential direction of protruding portion 618 are spaced from each other. Specifically, protruding portion 618 is welded to outer frame 110 of first side frame 100 such that an angle θ formed between a first line L1 and a second line L2 is 180 degrees or more and less than 360 degrees. First line L1 is a straight line connecting a starting point A of the welding on the outer circumferential surface of protruding portion 618 and the center of protruding portion 618. Second line L2 is a straight line connecting an ending point B of the welding on the outer circumferential surface of protruding portion 618 and the center of protruding portion 618. Protruding portion 618 is more preferably welded to outer frame 110 such that aforementioned angle θ is 220 degrees or more and 300 degrees or less.

Inner frame 120 is disposed on the inner side of outer frame 110 in the seat width direction so as to face outer frame 110. Inner frame 120 is formed as a plate. For example, both ends of inner frame 120 in the seat forward and backward directions are bent outward in the seat width direction. These ends of inner frame 120 in the seat forward and backward directions and the ends of outer frame 110 in the seat forward and backward directions overlap each other, causing first side frame 100 to form a closed cross section as a whole. These overlapping portions are welded together, for example.

Inner frame 120 is provided with a through hole 121 that allows the insertion of cylindrical portion 612. With cylindrical portion 612 being positioned in this through hole 121, a boundary portion between an outer circumferential surface of cylindrical portion 612 and inner frame 120 is welded by arc welding or the like from the inner side (lower side in FIG. 3) of inner frame 120 in the seat width direction. A welded portion W2 is formed by this welding. It should be noted that FIGS. 2 and 3 show protruding portion insertion hole 111 and through hole 121 in an enlarged manner for the purpose of illustration, and do not represent the actual dimensions.

Reinforcing member 300 is a member for reinforcing first side frame 100. Reinforcing member 300 is connected (for example, welded) to first side frame 100. Reinforcing member 300 is formed as a plate. Reinforcing member 300 is preferably connected to a side surface of outer frame 110 on the side (lower side in FIG. 3) facing inner frame 120, or to a side surface of inner frame 120 on the side (upper side in FIG. 3) facing outer frame 110. Reinforcing member 300 may, however, be connected to a side surface of inner frame 120 on the side (lower side in FIG. 3) opposite to the side facing outer frame 110. Reinforcing member 300 has a greater thickness than outer frame 110 and inner frame 120.

Second side frame 200 may form a closed cross section in a manner similar to first side frame 100, or may be formed of a single plate-like member. When second side frame 200 is formed of a plate-like member, both ends of second side frame 200 in the seat forward and backward directions are bent inward in the seat width direction.

Second side frame 200 is provided with a protruding portion insertion hole (not shown) into which the protruding portion of the second collar is inserted, that is, a protruding portion insertion hole that allows the insertion of the protruding portion and has a shape smaller than the outer shape of the cylindrical portion. With the protruding portion of the second collar being inserted in this protruding portion insertion hole, the protruding portion of the second collar is welded to second side frame 200 by arc welding or the like from the outer side of second side frame 200 in the seat width direction.

As described above, in seat frame 10 of the present embodiment, protruding portion 618 having a smaller outer shape than cylindrical portion 612 is welded to first side frame 100 while being inserted in protruding portion insertion hole 111. Thus, the space required to attach first collar 610 of coupling member 600 to first side frame 100, including welded portion W1, can be reduced. As a result, the space for attachment of air bag unit 60 and the like is ensured for first side frame 100. Stated in another way, the position where structural member 500 is connected to first side frame 100 can be located toward the front in the seat forward and backward directions, while the space for attachment of air bag unit 60 and the like is ensured, whereby the effect of reinforcing first side frame 100 by structural member 500 is improved.

In addition, since protruding dimension h of protruding portion 618 from closing portion 614 is set to be equal to the thickness of outer frame 110 of first side frame 100, butt welding between protruding portion 618 and outer frame 110 can be performed in reduced space.

In addition, since welded portion W1 has the shape extending continuously along the circumferential direction of protruding portion 618 over the region having the length equal to or greater than half the circumference of protruding portion 618 of the outer circumferential surface of protruding portion 618, tilting of first collar 610 relative to first side frame 100 is suppressed.

Moreover, since one end and the other end of welded portion W1 in the circumferential direction of protruding portion 618 are spaced from each other, repeated heat input to starting point A of the welding is suppressed. Quality control of welded portion W1 is thereby facilitated.

Moreover, since outer surface 615 of closing portion 614 is in surface contact with outer frame 110, this outer surface 615 functions as an overlapping that overlaps outer frame 110. Protruding portion 618 and outer frame 110 can thereby be stably welded together.

Moreover, the protruding portion of the second collar (not shown) is also welded to second side frame 200 while being positioned in the protruding portion insertion hole in second side frame 200 (not shown). As a result, both the space required to attach first collar 610 to first side frame 100 and the space required to attach the second collar to second side frame 200 can be reduced, while first side frame 100 and second side frame 200 are reinforced by structural member 500.

It should be noted that protruding portion 618 may have a polygonal cylindrical outer circumferential surface in the embodiment described above. In this case, protruding portion insertion hole 111 is also preferably formed to have a polygonal outer shape corresponding to the outer shape of protruding portion 618. Furthermore, in this case, a boundary portion between the outer circumferential surface of protruding portion 618 and first side frame 100 is welded by laser welding.

In addition, structural member 500 may be formed in a polygonal cylindrical shape. In this case, cylindrical portion 612 of first collar 610 and the cylindrical portion of the second collar are formed as polygonal cylinders corresponding to the outer shape of structural member 500.

In addition, structural member 500 may be connected only to first side frame 100 via first collar 610. Stated in another way, the second collar may be omitted, and coupling member 600 may be formed only of first collar 610. In this case, a link member or the like is connected as structural member 500 to first collar 610.

In addition, first side frame 100 is not limited to the shape forming a closed cross section, but may be formed of a single plate-like member. In this case, both ends of first side frame 100 in the seat forward and backward directions are bent inward in the seat width direction.

In addition, outer surface 615 of closing portion 614 may be formed in a shape that makes point contact or line contact, instead of the surface contact, with first side frame 100.

The following is a summary of the present disclosure.

A seat frame according to the present disclosure includes: a first side frame and a second side frame forming a framework of a vehicle seat; a structural member connected to at least one of the first side frame and the second side frame; and a coupling member welded to the at least one of the side frames so as to couple the structural member to the at least one of the side frames. The coupling member has a cylindrical portion connected to an end of the structural member, a closing portion closing one opening in the cylindrical portion, and a protruding portion having a smaller outer shape than the cylindrical portion, and protruding outward in an axial direction of the cylindrical portion from the closing portion. The at least one of the side frames is provided with a protruding portion insertion hole that allows insertion of the protruding portion and has a shape smaller than the outer shape of the cylindrical portion. The protruding portion is welded to the at least one of the side frames while being positioned in the protruding portion insertion hole.

In the present seat frame, the protruding portion having a smaller outer shape than the cylindrical portion is welded to the side frame while being inserted in the protruding portion insertion hole. Thus, the space required to attach the coupling member to the side frame, including a welded portion formed by the welding between the protruding portion and the side frame, can be reduced.

Preferably, a protruding dimension of the protruding portion from the closing portion is set to be equal to a thickness of the at least one of the side frames.

As a result, butt welding between the protruding portion and the side frame can be performed in reduced space.

Preferably, the protruding portion has a cylindrical outer circumferential surface. A welded portion formed by the welding between the outer circumferential surface of the protruding portion and the at least one of the side frames is formed at a boundary portion between the outer circumferential surface of the protruding portion and the at least one of the side frames. The welded portion has a shape extending continuously along a circumferential direction of the protruding portion over a region having a length equal to or greater than half a circumference of the protruding portion of the outer circumferential surface of the protruding portion, with one end and the other end of the welded portion in the circumferential direction of the protruding portion being spaced from each other.

As a result, quality control of the welded portion can be facilitated, while tilting of the coupling member relative to the side frame due to the welding is suppressed. Specifically, since the welded portion has the shape extending continuously along the circumferential direction of the protruding portion over the region having the length equal to or greater than half the circumference of the protruding portion of the outer circumferential surface of the protruding portion, the tilting of the coupling member relative to the side frame is suppressed. In addition, since one end and the other end of the welded portion in the circumferential direction of the protruding portion are spaced from each other, repeated heat input to a starting point of the welding is suppressed, whereby the quality control of the welded portion is facilitated.

Preferably, the closing portion has an outer surface having a shape making surface contact with the at least one of the side frames. The outer surface of the closing portion is in surface contact with the at least one of the side frames.

As a result, the outer surface of the closing portion functions as an overlapping that overlaps the side frame, thus allowing the protruding portion and the side frame to be stably welded together.

Preferably, the structural member has a shape extending in a seat width direction between the first side frame and the second side frame. The coupling member has a first collar welded to the first side frame so as to couple one end of the structural member to the first side frame, and a second collar welded to the second side frame so as to couple the other end of the structural member to the second side frame. The first collar and the second collar each have the cylindrical portion, the closing portion, and the protruding portion. Each of the first side frame and the second side frame is provided with the protruding portion insertion hole. The protruding portion of the first collar is welded to the first side frame while being positioned in the protruding portion insertion hole in the first side frame. The protruding portion of the second collar is welded to the second side frame while being positioned in the protruding portion insertion hole in the second side frame.

As a result, both the space required to attach the first collar of the coupling member to the first side frame and the space required to attach the second collar of the coupling member to the second side frame can be reduced, while the first side frame and the second side frame are reinforced by the structural member.

As has been described, according to the present disclosure, a seat frame capable of achieving reduced space required to attach a coupling member to a side frame can be provided.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A seat frame comprising:
a first side frame and a second side frame forming a framework of a vehicle seat;
a structural member connected to at least one of the first side frame and the second side frame; and
a coupling member welded to the at least one of the side frames so as to couple the structural member to the at least one of the side frames,
the coupling member having
a cylindrical portion connected to an end of the structural member, wherein the cylindrical portion has an outer shape,
a closing portion closing one opening in the cylindrical portion, and
a protruding portion having a smaller outer shape than the cylindrical portion, and protruding outward in an axial direction of the cylindrical portion from the closing portion,
the at least one of the side frames being provided with a protruding portion insertion hole that allows insertion of the protruding portion and has a shape smaller than the outer shape of the cylindrical portion, and
a welded portion connecting the at least one of the side frames with the protruding portion positioned in the protruding portion insertion hole.

2. The seat frame according to claim 1, wherein
a protruding dimension of the protruding portion from the closing portion is set to be equal to a thickness of an outer frame of the at least one of the side frames.

3. The seat frame according to claim 1, wherein
the protruding portion has a cylindrical outer circumferential surface,
the welded portion connecting the outer circumferential surface of the protruding portion and the at least one of the side frames is formed at a boundary portion between the outer circumferential surface of the protruding portion and the at least one of the side frames, and
the welded portion has a shape extending continuously along a circumferential direction of the protruding portion over a region having a length equal to or greater than half a circumference of the outer circumferential surface of the protruding portion, with a first end and a second end of the welded portion in the circumferential direction of the protruding portion being spaced from each other.

4. The seat frame according to claim 1, wherein
the closing portion has an outer surface having a shape making surface contact with the at least one of the side frames, and
the outer surface of the closing portion is in surface contact with the at least one of the side frames.

5. The seat frame according to claim 1, wherein
the structural member has a shape extending in a seat width direction between the first side frame and the second side frame,
the coupling member has
a first collar welded to the first side frame so as to couple a first end of the structural member to the first side frame, and
a second collar welded to the second side frame so as to couple a second end of the structural member to the second side frame,
the first collar and the second collar each having the cylindrical portion, the closing portion, and the protruding portion, and
each of the first side frame and the second side frame is provided with the protruding portion insertion hole,
wherein the welded portion comprises:
a first welded portion connecting the first side frame with the protruding portion of the first collar positioned in the protruding portion insertion hole in the first side frame, and a second welded portion connecting the second side frame with the protruding portion of the second collar positioned in the protruding portion insertion hole in the second side frame.

\* \* \* \* \*